United States Patent
Rodd et al.

(10) Patent No.: US 11,327,912 B2
(45) Date of Patent: May 10, 2022

(54) CONTROLLING THE APPLICATION TIME OF RADIO FREQUENCY FRONT END TRIGGERS BASED ON EXECUTION OF SEQUENCES

(71) Applicant: QUALCOMM Incorporated, San Diego, CA (US)

(72) Inventors: Reza Rodd, San Diego, CA (US); Scott Davenport, Merrimack, NH (US); Umesh Srikantiah, San Diego, CA (US); ZhenQi Chen, South Boston, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/003,697

(22) Filed: Aug. 26, 2020

(65) Prior Publication Data
US 2021/0081340 A1 Mar. 18, 2021

Related U.S. Application Data

(60) Provisional application No. 62/899,521, filed on Sep. 12, 2019.

(51) Int. Cl.
*G06F 3/00* (2006.01)
*G06F 13/20* (2006.01)
(Continued)

(52) U.S. Cl.
CPC .......... *G06F 13/20* (2013.01); *G06F 13/4282* (2013.01); *H04L 69/323* (2013.01); *H04B 1/40* (2013.01)

(58) Field of Classification Search
CPC ........ G06F 13/4282; G06F 5/06; G06F 13/20; G06F 2213/0016; H04L 69/323; H04L 41/0806; H04L 12/4015; H04B 1/40
(Continued)

(56) References Cited

U.S. PATENT DOCUMENTS

| 2011/0161554 A1* | 6/2011 | Selinger | G06F 13/1668 711/103 |
| 2018/0113834 A1* | 4/2018 | O'Shea | G06F 13/4282 |
| 2020/0153470 A1* | 5/2020 | Ngo | G06F 13/4027 |

FOREIGN PATENT DOCUMENTS

EP 3367247 A1 8/2018

OTHER PUBLICATIONS

International Search Report and Written Opinion—PCT/US2020/048251—ISA/EPO—dated Dec. 12, 2004.

* cited by examiner

*Primary Examiner* — Chun Kuan Lee
(74) *Attorney, Agent, or Firm* — Qualcomm Incorporated

(57) ABSTRACT

Systems, methods, and apparatus for improving bus latency are described. A data communication method includes receiving a trigger actuation command from a bus master coupled to the serial bus, determining that a sequence is being executed in the slave device, and providing a trigger actuation signal corresponding to the trigger actuation command when execution of the sequence has been completed. A sequence initiation command may be received before the trigger actuation command, and the sequence may be initiated in response to the sequence initiation command. The trigger actuation command may be queued in a first queue, the sequence initiation command in may be queued in a second queue. Trigger actuation commands in the first queue may be associated with sequence initiation commands in the second queue. The sequence may be initiated in response to a sequence initiation command associated with the trigger actuation command corresponding to the trigger actuation signal.

30 Claims, 11 Drawing Sheets

(51) Int. Cl.
*G06F 13/42* (2006.01)
*H04L 69/323* (2022.01)
*H04B 1/40* (2015.01)

(58) Field of Classification Search
USPC .......................................................... 710/5
See application file for complete search history.

CONTROLLING THE APPLICATION TIME OF RADIO FREQUENCY FRONT END TRIGGERS BASED ON EXECUTION OF SEQUENCES

PRIORITY CLAIM

This application claims priority to and the benefit of U.S. Provisional Patent Application Ser. No. 62/899,521 filed in the U.S. Patent Office on Sep. 12, 2019, the entire content of this application being incorporated herein by reference as if fully set forth below in its entirety and for all applicable purposes.

TECHNICAL FIELD

The present disclosure relates generally to serial communication over a shared serial bus and, more particularly, to optimizing timing of time-critical triggers that are activated through transmissions over the shared serial bus.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol. In one example, a serial bus operated in accordance with an Inter-Integrated Circuit (I2C bus or I²C). The I2C bus was developed to connect low-speed peripherals to a processor, where the I2C bus is configured as a multi-drop bus. A two-wire I2C bus includes a Serial Data Line (SDA) that carries a data signal, and a Serial Clock Line (SCL) that carries a clock signal.

A serial bus may employ a multi-master protocol in which one or more devices can serve as a master and a slave for different messages transmitted on the serial bus. In one example, Improved Inter-Integrated Circuit (I3C) protocols may be used to control operations on a serial bus. I3C protocols are defined by the Mobile Industry Processor Interface (MIPI) Alliance and derive certain implementation aspects from the I2C protocol. In another example, the Radio Frequency Front-End (RFFE) interface defined by the MIPI Alliance provides a communication interface for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communication device, multiple antennas and radio transceivers may support multiple concurrent RF links. In another example, the system power management interface (SPMI) defined by the MIPI Alliance provides a hardware interface that may be implemented between baseband or application processors and peripheral components. In some implementations, the SPMI is deployed to support power management operations within a device.

In many instances, a multi-drop serial bus may be provided to support a combination of high-priority, low-latency communication and lower-priority communication. Latency can be adversely affected when multiple devices coupled to the serial bus are concurrently active and attempting to gain bus access for transmission initiation. Degraded latencies can lead to a failure to meet certain applications performance limits. For example, degraded latency times can result in unreliable timing when one device attempts to trigger an action in another device at a precise time being impeded due to degraded latencies. As mobile communication devices continue to include a greater level of functionality, improved serial communication techniques are needed to improve trigger mechanisms.

SUMMARY

Certain aspects of the disclosure relate to systems, apparatus, methods and techniques that can control timing of triggers in a slave device using sequencer logic in the slave device. The slave device may be coupled to a serial bus is operated in accordance with RFFE, SPMI or I3C protocols, for example.

In various aspects of the disclosure, a data communication method performed at a slave device coupled to a serial bus includes receiving a trigger actuation command from a bus master coupled to the serial bus, determining that a sequence is being executed in the slave device, and providing a trigger actuation signal corresponding to the trigger actuation command when execution of the sequence has been completed.

In various aspects of the disclosure, a data communication apparatus has means for receiving commands from a bus master coupled to a serial bus, the means for receiving commands being configured to receive a trigger actuation command from the bus master, means for determining that a sequence is being executed in the data communication apparatus, and means for providing a trigger actuation signal corresponding to the trigger actuation command when execution of the sequence has been completed. The data communication apparatus may be configured to operate as a slave device.

In various aspects of the disclosure, a processor-readable storage medium stores or maintains code for receiving a trigger actuation command from a bus master coupled to a serial bus, determining that a sequence is being executed in a slave device, and providing a trigger actuation signal corresponding to the trigger actuation command when execution of the sequence has been completed.

In some examples, the slave device may receive a sequence initiation command before receiving the trigger actuation command. The slave device may initiate the sequence in response to the sequence initiation command. The slave device may receive trigger configuration information before the trigger actuation command is received. The slave device may populate one or more holding registers using information provided in the trigger configuration information. The slave device may cause content of the one or more holding registers to be transferred to corresponding destination registers when the trigger actuation signal is provided.

In some examples, the slave device may queue the trigger actuation command in a first queue. The slave device may receive a sequence initiation command before receiving the trigger actuation command. The slave device may queue the sequence initiation command in a second queue. The slave device may initiate the sequence when the sequence initiation command exits the second queue. Each of a plurality of trigger actuation commands in the first queue may be associated with one of a plurality of sequence initiation commands in the second queue. The sequence may be initiated in response to a sequence initiation command that is associated with the trigger actuation command corresponding to the trigger actuation signal.

In some examples, the slave device may queue a plurality of prioritized trigger actuation commands in a trigger queue and may provide the trigger actuation signal based on relative priorities of two or more of the plurality of prioritized trigger actuation commands.

DETAILED DESCRIPTION

Figure 1:
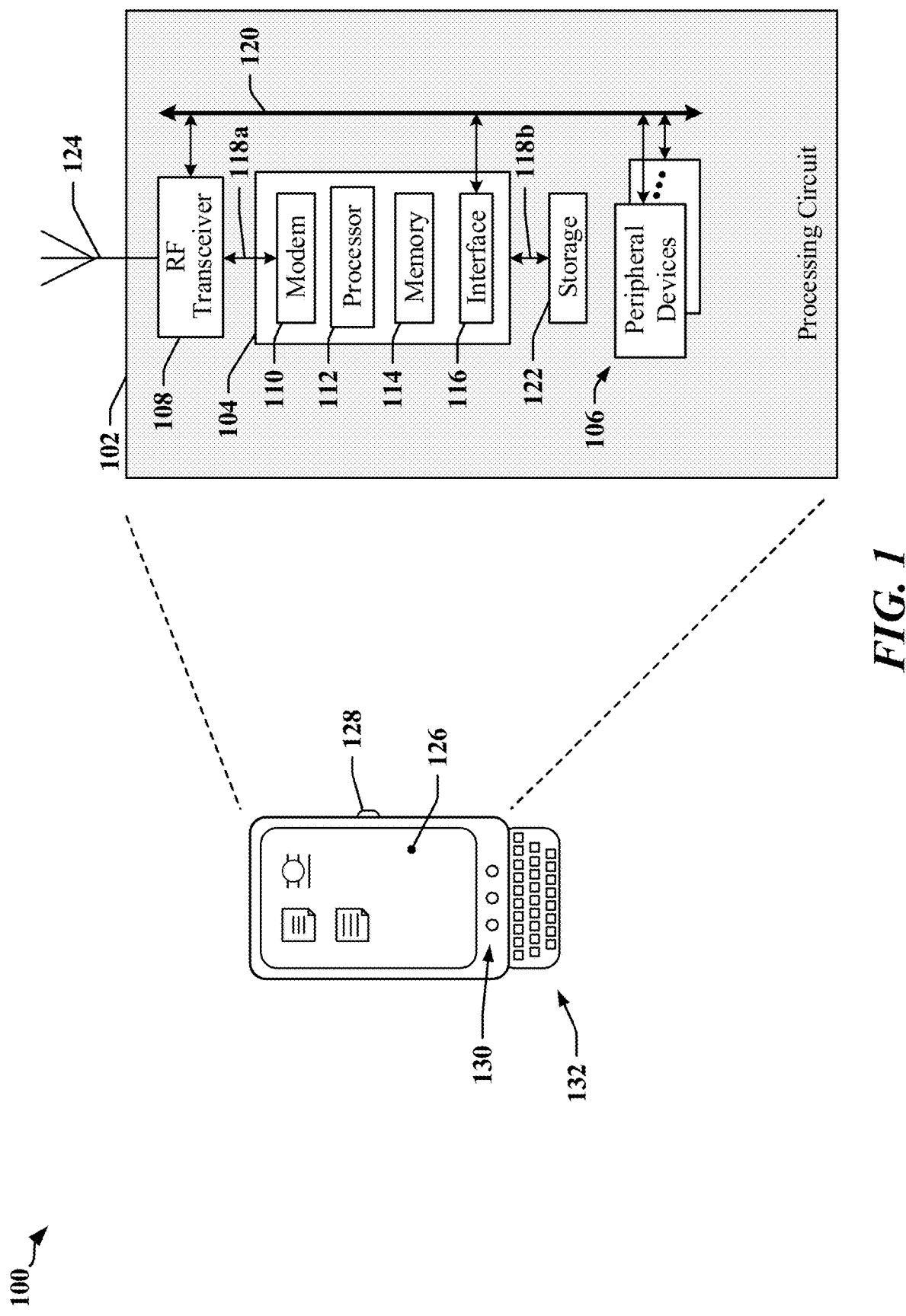
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with multiple standards or protocols defined. For example, the serial bus may be operated in accordance with an I2C, I3C, SPMI, and/or RFFE protocol, or another protocol. The serial bus may be configured for half-duplex operation. Increased utilization of serial buses, and/or the imposition of more stringent timing constraints in support of applications, peripherals and sensors can result in demand for reduced transmission latencies. Transmission latency may include the time required to terminate a transaction in process on the serial bus, bus turnaround (between transmit mode and receive mode), bus arbitration or command transmissions specified by protocol.

High bus latency can limit the capabilities and functionality of a serial bus in certain applications. For example, bus latency considerations may limit the number of radio frequency (RF) devices that can be coupled by an I3C, RFFE or SPMI bus. In some examples, multiple serial buses may be implemented to enable RF or other low-latency devices to communicate within tight time constraints, including where bus throughput, utilization and/or other operating characteristics are otherwise easily supported by a single bus.

Certain operations in radio frequency IC require very low-latency communications. For example, configuration and reconfiguration of circuits used to drive multiple antennas may generate large volumes of messages, commands and signaling directed to multiple radio frequency components. In many instances, the messages may include configuration parameters that are to be applied at a time determined by a controlling device. In some instances, triggers may be sent to activate a configuration. Triggers may be sent to initiate a sequence of configurations or actions in a radio frequency device according to a defined timeline. Congestion and bus-latency can result in mistiming of triggers when the triggers are configured and/or initiated through transmissions over a serial bus.

The increased complexity of RFFE bus architectures that are configured to support newer radio access technologies, including fourth generation (4G) and fifth generation (5G) wireless communication technologies can add to the potential for traffic congestions on the RFFE bus. For example, support for carrier aggregation (CA) can increase RFFE bus timing complexity because of increased bus contention events. A Bus Owner Master (BoM) may be unable to send trigger information and/or actuate triggers at the exact time necessary to enable slave devices to meet protocol-defined timing. In one example, the trigger information includes one or more configuration parameters directed to registers, where the configuration parameters are to be loaded into registers at a defined or required time. In this example, an actuation signal may be generated that causes the configuration parameters to be loaded into the registers. The registers, or bits stored in the registers, may control one or more RF front end devices or functions.

According to certain aspects of this disclosure, the timing of trigger actuation may be controlled at the slave device. In some implementations, a slave may have expander or sequencer logic that may be used to control actuation of triggers that have been previously configured by a BoM. In one example, the expander or sequencer logic may execute a preconfigured sequence of register accesses in response to a short command received from the BOM. The use of slave logic to control trigger actuation may overcome latency, contention and other issues arising from increased bus complexity and traffic. The BoM may configure and activate triggers and may configure actuation timing using short commands, rather than the long sequences used in conventional systems to actuate triggers in multiple slave devices. The slave expander or sequencer logic can execute a sequence of register programming internally and without direct bus or BoM involvement.

Certain aspects disclosed herein apply to RFFE slave devices that are capable of executing command sequences using microcontrollers, sequencers, state machines, programmable logic, or the like. The BoM may configure the slave device such that one or more triggers are actuated after a sequence executed by the expander or sequencer logic in the slave has been completed. The BoM can configure the triggers, and the sequence-based timing with the expectation that the triggers will be actuated at the configured time and/or in synchronization with actuation in one or more other slave devices. The techniques disclosed herein enable a BoM to preconfigure triggers in a slave device such that the triggers are actuated without the need for further synchronization between the BoM and the slave device to ensure that the triggers are actuated as scheduled. For example, the trigger information may include parameters to be transferred to one or more registers in the slave device only when an identified programming sequence has been completed.

The BoM may send triggers and/or trigger information to preconfigure the slave device when bus traffic and other conditions permit. In some instances, the triggers and/or trigger information may be provided to the slave device while the slave device is executing an internal sequence. The slave device may store the triggers or trigger information and may delay transfer of triggers or trigger information to destination registers until the internal sequence finishes. The slave device may then generate an actuation signal or event that causes the trigger information to be transferred to designated registers.

In one example, a data communication apparatus has an interface circuit, a sequencer and a trigger handler. The interface circuit may be configured to couple the data communication apparatus to a serial bus and to receive a trigger actuation command from a bus master coupled to the serial bus. The sequencer may be configured to provide a sequence status indicator. The trigger handler may be configured to provide a trigger actuation signal corresponding to the trigger actuation command when the sequence status indicator indicates that execution of a sequence has been completed.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that employs a data communication bus. The apparatus 100 may include an SoC, or a processing circuit 102 having multiple circuits or devices 104, 106 and/or 108, which may be implemented in one or more ASICs. In one example, the apparatus 100 may operate as a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 or an external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with standards-defined communication specifications or protocols. The processing circuit 102 may include or control a power management function that configures and manages the operation of the apparatus 100.

Figure 2:
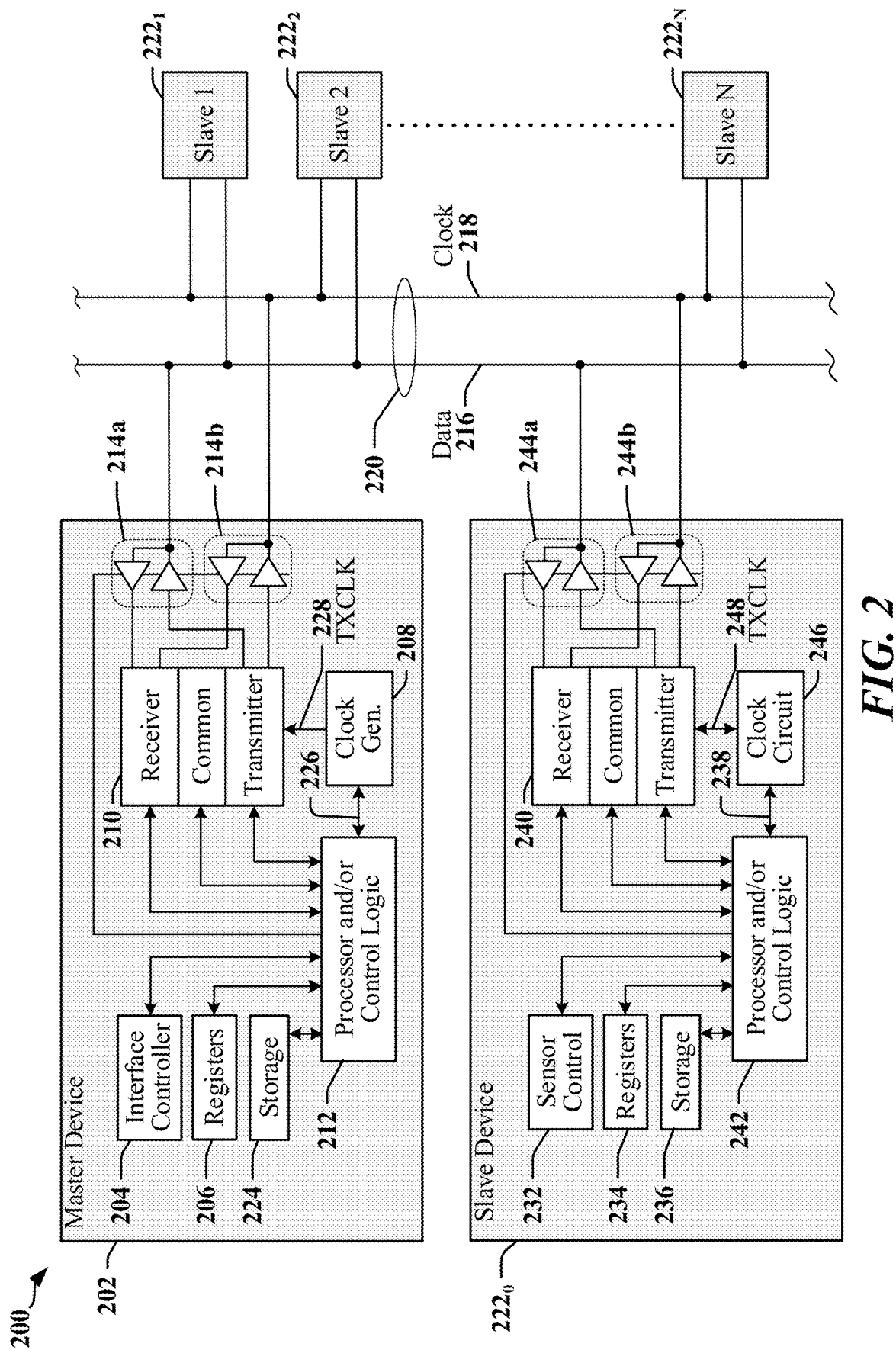
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an application processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222_0$-$222_N$ may be used to control, manage or monitor a sensor device. Communications between devices 202 and $222_0$-$222_N$ over the serial bus 220 is controlled by a bus master device 202. Certain types of bus can support multiple bus master devices 202.

In one example, a master device 202 may include an interface controller 204 that manages access to the serial bus, configures dynamic addresses for slave devices $222_0$-$222_N$ and/or generates a clock signal 228 to be transmitted on a clock line 218 of the serial bus 220. The master device 202 may include configuration registers 206 or other storage 224, and other control logic 212 configured to handle protocols and/or higher-level functions. The control logic 212 may include a processing circuit having a processing device such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clock signals 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit having a processing device such as a state machine, sequencer, signal processor or general-purpose processor. The transceiver 240 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clock signals 238 may be used by the control logic 242 and other functions, circuits or modules.

The serial bus 220 may be operated in accordance with RFFE, I2C, I3C, SPMI, or other protocol. In some instances, two or more devices 202, $222_0$-$222_N$ may be configured to operate as a bus master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, data is transmitted on a data line 216 of the serial bus 220 based on timing information provided in a clock signal transmitted on the clock line 218 of the serial bus 220. In some instances, data may be encoded in the signaling state, or transitions in signaling state of both the data line 216 and the clock line 218.

Figure 3:
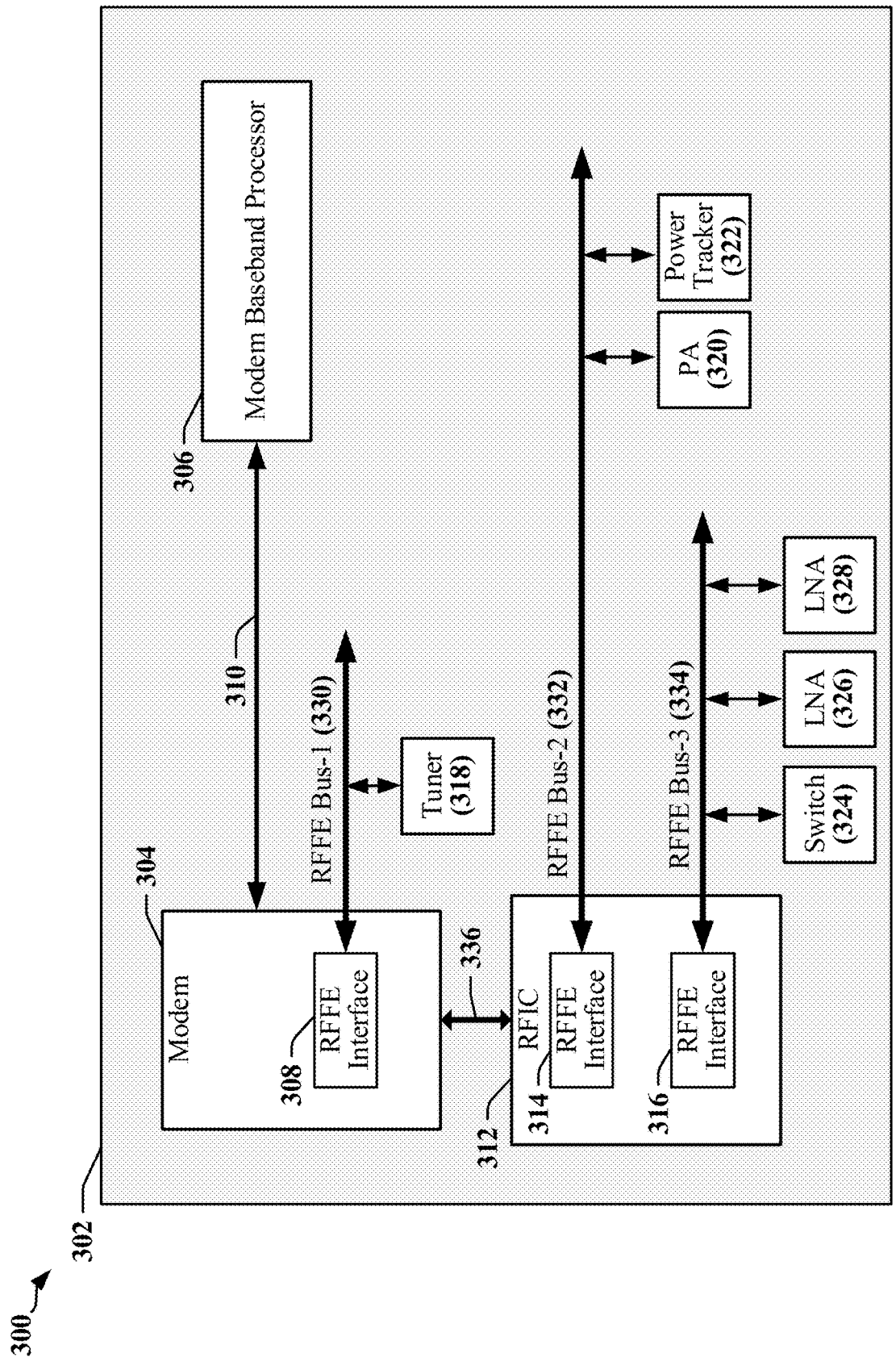
FIG. 3 illustrates a device configuration for coupling various radio frequency front-end devices using multiple RFFE buses.

FIG. 3 illustrates certain aspects of an apparatus 300 that includes multiple RFFE buses 330, 332, 334 configured coupled to various RF front-end devices 318, 320, 322, 324, 326, 328. A modem 302 includes an RFFE interface 308 that couples the modem 302 to a first RFFE bus 330. The modem 302 may communicate with a baseband processor 306 and a Radio-Frequency IC (RFIC 312) through one or more communication links 310, 336. The illustrated apparatus 300 may be embodied in one or more of a mobile communication device, a mobile telephone, a mobile computing system, a mobile telephone, a notebook computer, a tablet computing device, a drone, an appliance, a sensor, a media player, a gaming device, a wearable computing or communications device, an appliance, or the like.

In various examples, the apparatus 300 may be implemented with one or more baseband processors 306, modems 304, RFICs 312, multiple communications links 310, 336, multiple RFFE buses 330, 332, 334 and/or other types of buses. The apparatus 300 may include other processors, circuits, modules and may be configured for various operations and/or different functionalities. In the example illustrated in FIG. 3, the modem 304 is coupled to an RF tuner 318 through its RFFE interface 308 and the first RFFE bus 330. The RFIC 312 may include one or more RFFE interfaces 314, 316, controllers, state machines and/or processors that can configure and control certain aspects of the RF front-end. The RFIC 312 may communicate with a PA 320 and a power tracking module 322 through a first of its RFFE interfaces 314 and the second RFFE bus 330. The RFIC 312 may communicate with a switch 324 and one or more LNAs 326, 328.

Bus latency can affect the ability of a serial bus to handle high-priority, real-time and/or other time-constrained messages. Low-latency messages, or messages requiring low bus latency, may relate to sensor status, device-generated real-time events and virtualized general-purpose input/output (GPIO). In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

In certain examples, latency-sensitive messages may include coexistence messages. Coexistence messages are transmitted in a multisystem platform to prevent or reduce instances of certain device types impinging on each other, including for example, switches 324, LNAs 326, 328, PAs 320 and other types of device that operate concurrently in a manner that can generate inter-device interference, or that could potentially cause damage to one or more active devices through high-power electromagnetic interference. Devices that may interfere with one another may exchange coexistence management (CxM) messages to permit each device to signal imminent actions that may result in interference or conflict. CxM messages may be used to manage operation of shared components including a switch 324, LNA 326, 328, PA 320 and/or an antenna.

Multi-drop interfaces such as RFFE, SPMI, I3C, etc. can reduce the number of physical input/output (I/O) pins used to communicate between multiple devices. Protocols that support communication over a multi-drop serial bus define a datagram structure used to transmit command, control and data payloads. Datagram structures for different protocols define certain common features, including addressing used to select devices to receive or transmit data, clock generation and management, interrupt processing and device priorities. In this disclosure, the example of RFFE protocols may be employed to illustrate certain aspects disclosed herein. However, the concepts disclosed herein are applicable to other serial bus protocols and standards.

Figure 4:
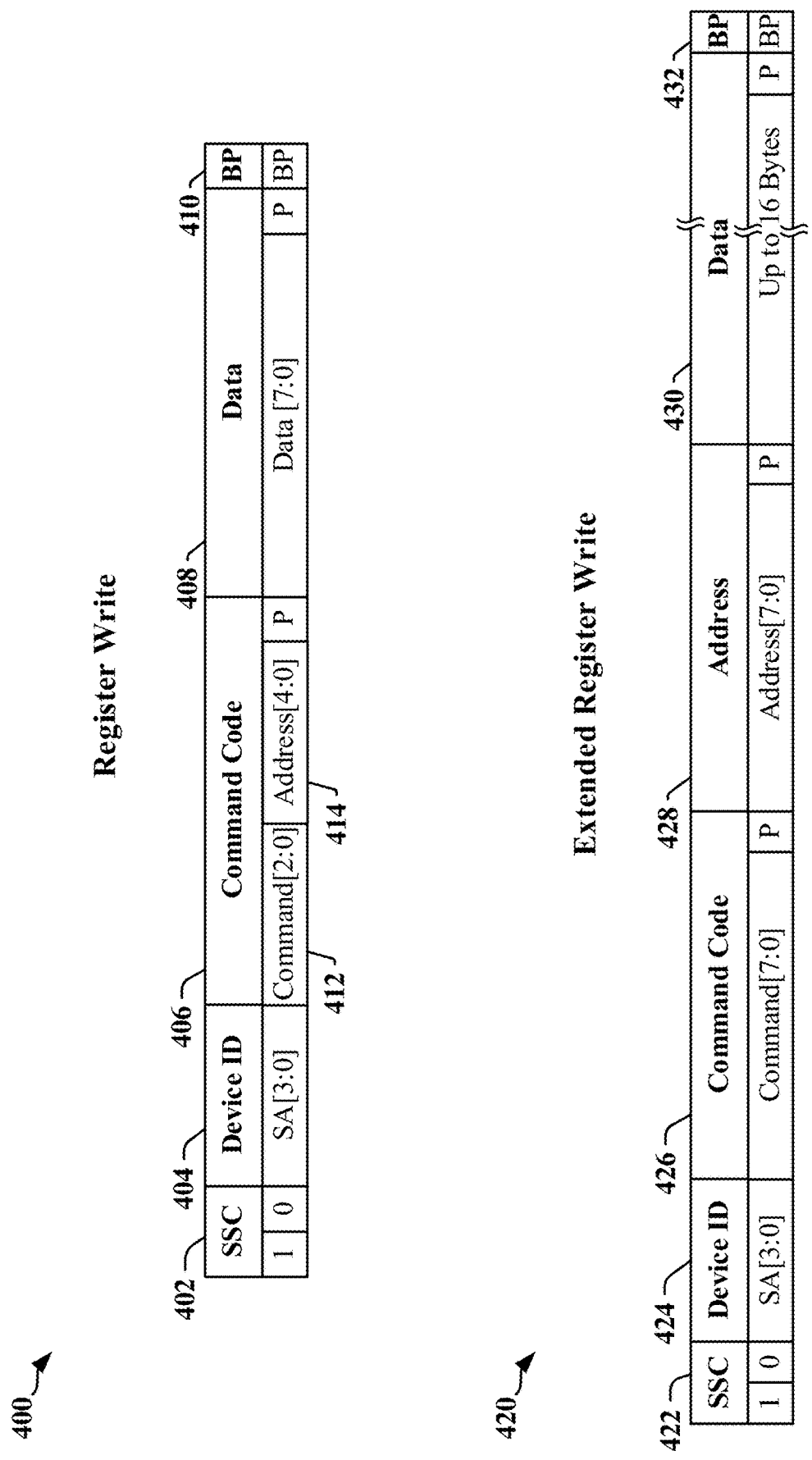
FIG. 4 illustrates datagram structures defined by RFFE protocols.

FIG. 4 illustrates datagram structures 400, 420 for a Register Write command and an Extended Register Write command. The datagram structures 400, 420 are defined by RFFE protocols, and can be used to efficiently write data to registers within the addressable register address range of a slave device. These datagram structures 400, 420 and similar or comparable datagram structures defined by other protocols may be adapted for use in accordance with certain aspects disclosed herein. The datagram structures 400, 420 commence with transmission of a two-bit sequence start condition (SSC 402, 422) followed by a four-bit device ID 404, 424. A nine-bit command field 406, 426 is transmitted next. In the Register Write command datagram structure 400, the nine-bit command field 406 includes a three-bit command code 412, a five-bit address field 414 and a parity bit. In the Extended Register Write command datagram structure 420, the nine-bit command field 406 is occupied by an eight-bit command code and a parity bit and followed by an address field 428 that carries an eight-bit register address and a parity bit. In the Register Write command datagram structure 400, a data field 408 carries a single data byte, while in the Extended Register Write command datagram structure 420 the data field 430 carries up to 16 data bytes. Each data byte is transmitted with a parity bit. Bus park signaling 410, 432 terminates the datagram structures 400, 420.

Triggers Transmitted Over a Multidrop Bus

Triggers provide a mechanism for RF front-end control, and triggers may be used to coordinate activities of different front-end components. Triggers can be used for a variety of purposes, including beam steering or beamforming, gain setting, antenna path multiplexer control, etc. In some devices, triggers may be configured, activated and/or actuated over a serial bus operated in accordance with RFFE protocols. In a first example, a BoM may transmit a command that includes a trigger configuration, including an action associated with the trigger, and where receipt of the command causes the trigger to take effect or be applied upon receipt. In the latter example, the trigger configured by the command may be referred to as a self-actuating trigger. In a second example, the BoM transmits a first command that configures one or more triggers. The configuration may define an action associated with the configured triggers and may activate one or more triggers. The BoM may transmit a second command that actuates activated triggers, whereby one or more of the actions defined by the first command are initiated when an activated trigger is actuated.

Figure 5:
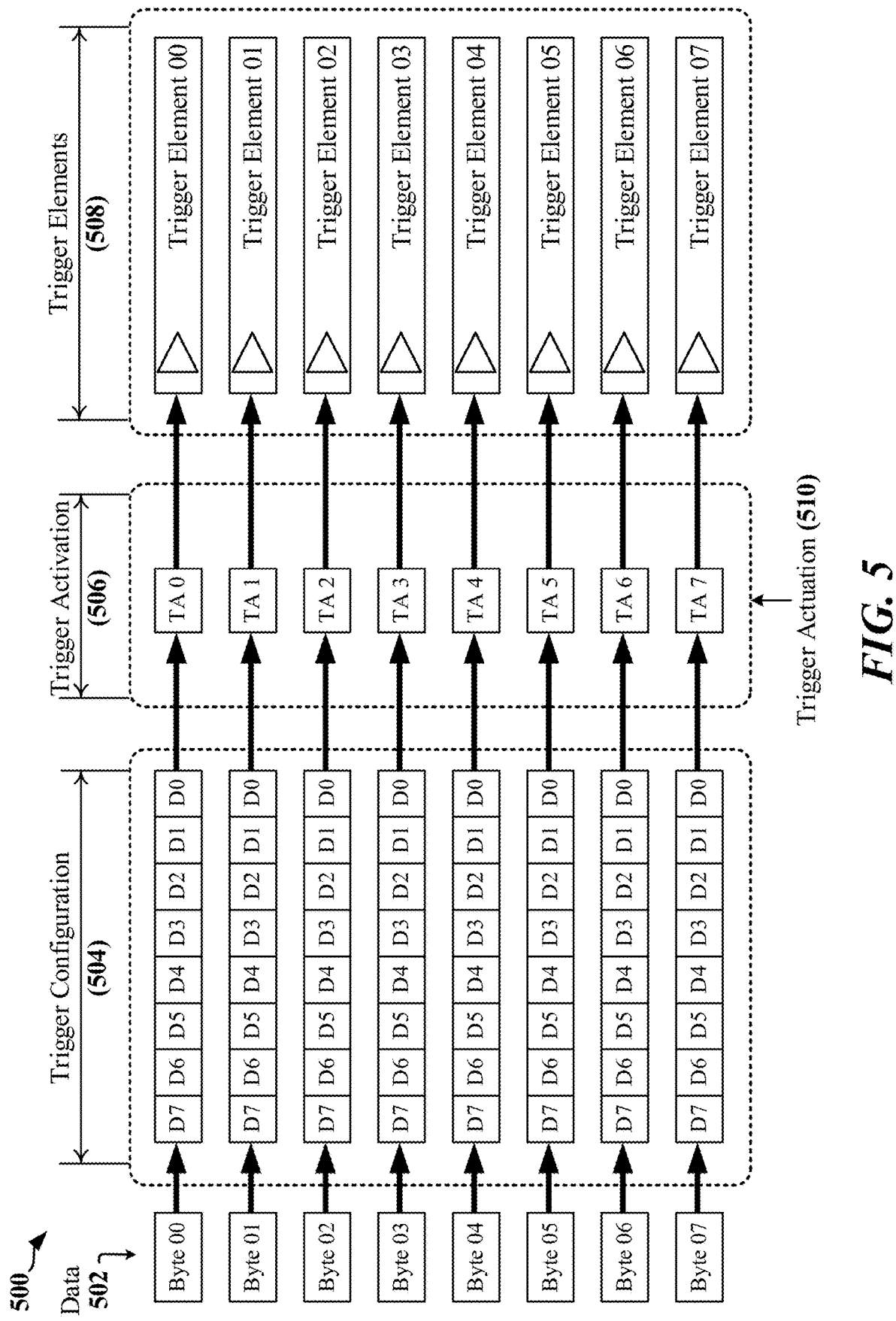
FIG. 5 illustrates actuation of triggers in accordance with certain aspects disclosed herein.

FIG. 5 illustrates a scheme 500 that illustrates actuation of activated triggers. In the illustrated example, configuration information is received as a plurality of data bytes 502, which may be stored in trigger configuration registers 504. The trigger configuration registers 504 may be written during a configuration transaction conducted over a serial bus, which may be operated in accordance with an RFFE protocol for example. The contents of the trigger configuration registers 504 may be forwarded to registers in target devices using a trigger activation procedure. The registers in the target devices may be used to configure or control one or more antennas, interfaces, modems, control circuits, processors or the like. For example, changes in values stored in the registers in the target devices may cause circuits in the slave device to generate a signal, message, interrupt or other type of event.

Trigger activation logic 506 may be configured to enable the contents of the trigger configuration registers 504 to be transferred to respective target devices in response to a trigger command or trigger actuation signal 510 received from a controlling device. In conventional systems, one or more trigger actuation commands may be transmitted to trigger the activation of configuration of at least a portion of targeted trigger elements 508. The trigger elements 508 may be associated with switches 324, LNAs 326, 328, PAs 320 and other types of device that operate concurrently in an RF front-end. In one example, a trigger actuation transmission configures a mask or gating logic that determines which trigger elements 508 will receive data from the trigger configuration registers 504 during actuation initiated by the trigger actuation signal 510. In one example, the trigger actuation signal 510 is generated at the end of a datagram used to carry a trigger actuation command, which may be provided in accordance with a datagram structure 400, 420 for a Register Write command or an Extended Register Write command illustrated in FIG. 4.

Advances in RF technology and the introduction of increased capabilities in communication devices increase pressure on latency times. For example, the deployment of radio access technologies such as the 5G New Radio technology defined by the 3rd Generation Partnership Project (3GPP) and the 802.11ax WLAN standard defined by the Institute of Electrical and Electronics Engineers (IEEE) 802.11 Working Group can require a 50% reduction in latency at conventional bus clock frequencies, increase complexity of RFFE bus architectures and increase the potential for traffic congestion on the bus. RFFE bus congestion and timing bottlenecks may be expected to exacerbate coexistence issues. Increased bus activity may increase bus contention issues where RFFE bus timing is complicated. In one example, bus contention events can increase when carrier aggregation is supported. In these and other examples, a BoM may be prevented from sending the triggers at an exact time needed by slave devices to meet the RF protocol timing.

In addition to the difficulty in guaranteeing that the BoM can transmit commands that cause one or more RFFE slaves to actuate triggers at an exact point of time, system protocol requirements may prevent the BoM from actuating multiple triggers at different times in the same slave device or different slave devices. In some implementations, slave devices may include expander or sequencer logic that executes preconfigured sequences of actions, and the BoM may not know with precision when a slave device will finish a current sequence. The BoM may be unable to align the timing of triggers sent to one or more slave devices without knowledge of the status of slave device. When multiple slave devices coupled to a serial bus are equipped with expander or sequencer logic, the BoM may attempt to align the timing of trigger transmissions to the execution time of the longest sequence executed by the slave devices.

Certain aspects disclosed herein provide mechanisms that enable a BoM to configure triggers with actuation controlled at the slave device. The triggers can be configured before the time defined for actuation, and a slave device may wait for completion of internal sequences before actuating the triggers. In one example, the BoM can send triggers ahead of time and when bus traffic conditions allow.

In one example, a slave device configured in accordance with certain aspects disclosed herein, uses expander or sequencer logic to control actuation of triggers that have been previously configured by a BoM. The BoM may configure and activate triggers and may configure actuation timing using short commands, rather than the long sequences used in conventional systems to actuate triggers in multiple slave devices. The slave expander or sequencer logic can execute a sequence of register programming internally and without direct bus or BoM involvement after the triggers have been configured.

Figure 6:
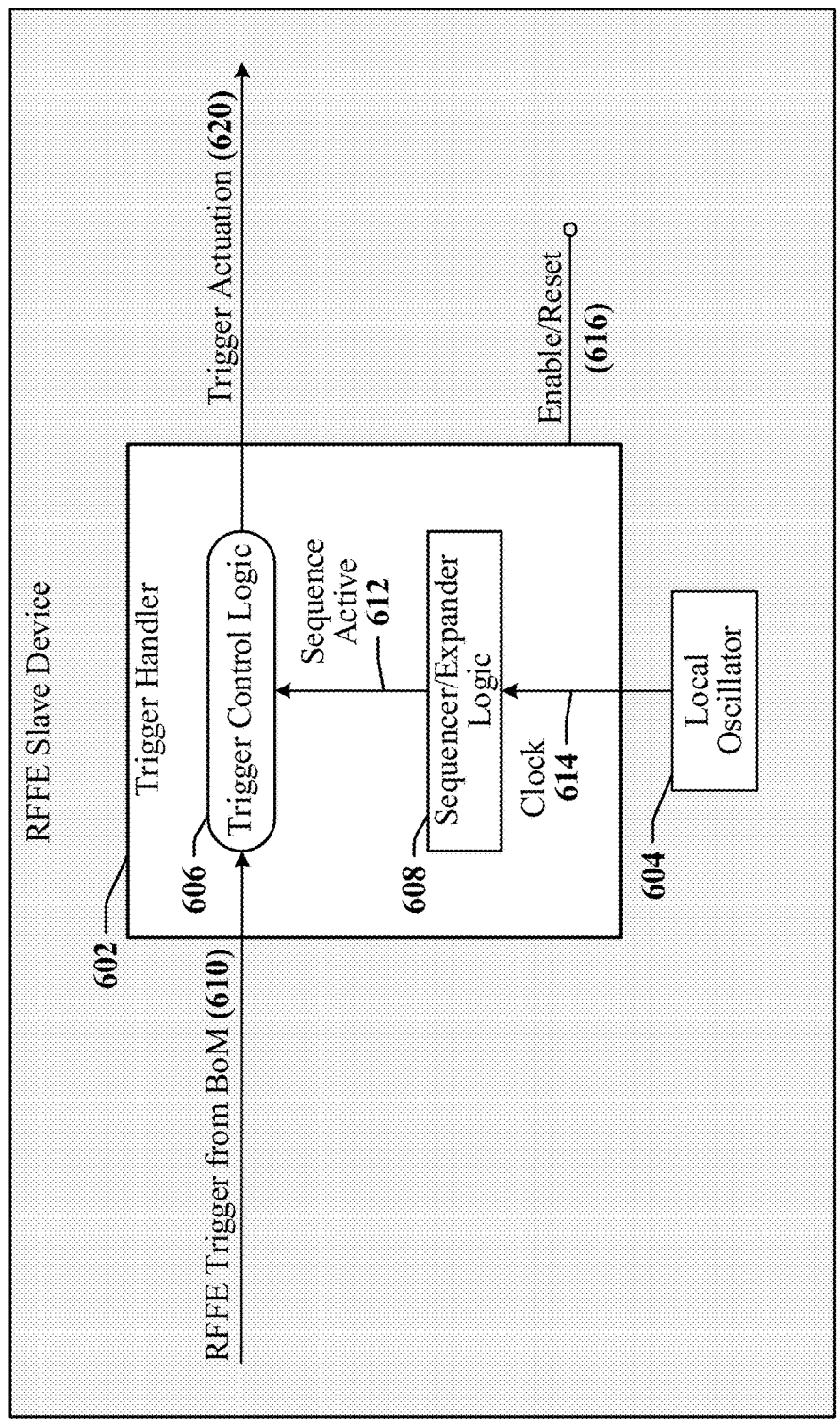
FIG. 6 illustrates certain features of a slave device that has been adapted to support slave managed trigger timing in accordance with certain aspects disclosed herein.

FIG. 6 illustrates certain features of a slave device 600 that has been adapted to support slave-managed trigger timing in accordance with certain aspects disclosed herein. In the example, the slave device 600 may be configured to operate as an RFFE peripheral. For the purposes of description, it can be assumed that trigger configuration and actuation information is communicated to the slave device 600 by a BoM in one or more commands. A trigger handler 602 may receive configuration information related to a trigger to be actuated after completion of a sequence being executed at the slave device 600. The configuration information may include trigger information that selects one or more triggers to be actuated after completion of execution of the sequence.

In some implementations, the slave device 600 may include certain of the architectural features illustrated in the slave device $222_0$ of FIG. 2. The slave device 600 may also include a trigger handler 602. In one example, the trigger handler 602 may be implemented using control logic 242 (see FIG. 2) that is configurable to perform multiple functions. In another example, the trigger handler 602 may be added for the purpose of managing triggers and/or other event-driven operations.

The trigger handler 602 may include or cooperate with sequencer logic 608. In one example, the sequencer logic includes a microcontroller or other general-purpose processing device. In another example, the trigger handler 602 includes one or more state machines that may be configurable or programmable. In another example, the trigger handler 602 may include a programmable logic controller or another type of logic that is capable of performing sequences of logic-controlled steps. The sequencer logic 608 may perform time-driven and/or event-driven sequences. The sequencer logic 608 may derive time information from a clock signal 614 provided by a local oscillator 604. In some instances, the sequencer logic 608 may derive time information from a clock line of a serial bus coupled to the slave device 600.

According to certain aspects disclosed herein, the application of a trigger 610 in a slave device 600 may be controlled or timed based on the status of a sequence that is executing in the slave device 600. The sequencer logic 608 may provide control signals that indicate state of operation of the sequencer logic 608. In one example, the control signals can include, a sequence start signal, a sequence completed signal and a sequence active signal 612. The sequence active signal 612 may indicate that the sequencer logic 608 is active and performing a sequence. The sequence active signal 612 may include a pulse that is transmitted when the sequencer logic 608 has completed or terminated a sequence. In some instances, the control signals may identify a specific sequence currently being executed by the sequencer logic 608.

According to certain aspects disclosed herein, accurate control over trigger actuation in the slave device 600 may be provided by holding triggers until a sequence performed in the slave device 600 has been completed or by applying the triggers only after completion of the sequence. One or more of the control signals generated by the sequencer logic 608 may be provided to trigger control logic 606. The trigger control logic 606 may use the control signals to determine the time of actuation of one or more triggers. The trigger control logic 606 may be configured in response to commands transmitted by the BoM to the slave device 600. In one example, the BoM may write trigger parameters to one or more holding registers in the slave device 600, and may send a trigger 610 by transmitting a command to the slave device 600 or by transmitting other signaling over the RFFE bus. In this example, the trigger control logic 606 monitors the sequence active signal 612 and provides a trigger actuation signal 620 that transfers the content of the holding registers to corresponding target or destination registers. A controller in the slave device 600 may provide signals 616 that can enable, disable, clear and/or reset the trigger control logic 606.

In operation, the BoM may send a command to the slave device 600, where the command is configured to cause the slave device 600 to start executing a sequence. The BoM may then send trigger information and/or a trigger activation command or signal to cause a trigger to be provided after execution of the sequence. The BoM need not be concerned with the execution time of the sequence on the slave device 600. In some instances, the slave device 600 may receive a trigger 610 and may determine whether a sequence is being executed. The slave device 600 may withhold a trigger until execution of the sequence has completed. In one example, the trigger actuation signal 620 may include a pulse that causes the content of holding registers to be loaded or transferred to corresponding target or destination registers. In some implementations, the trigger control logic 606 may include a programmable timer or delay circuit that can delay generation of the trigger actuation signal 620 until the end of a sequence has been detected. In these latter examples, the BoM may use the timer or delay circuit to align triggers between devices that are executing sequences of different durations.

Figure 7:
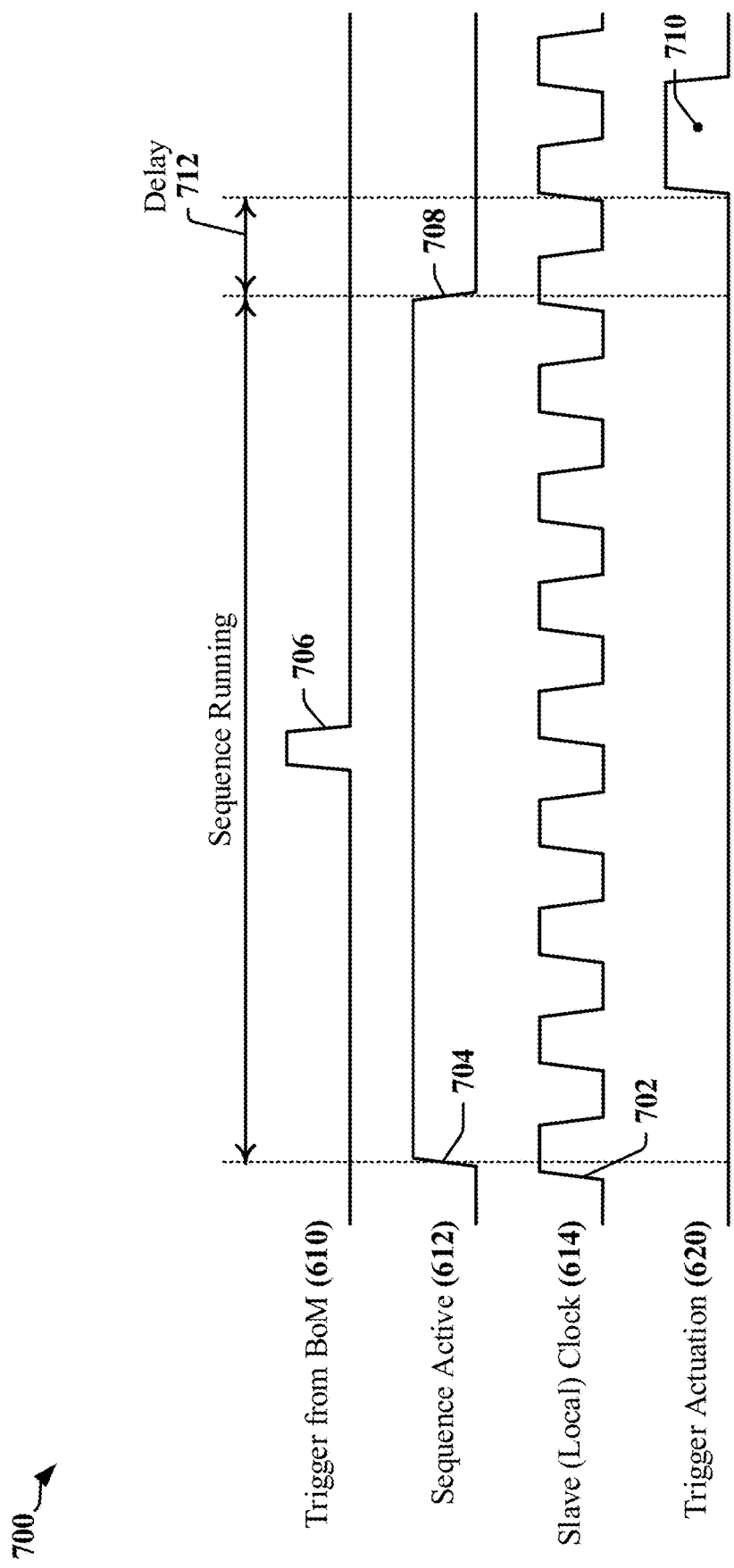
FIG. 7 is a timing diagram that illustrates control of triggering in a slave device provided in accordance with certain aspects disclosed herein.

FIG. 7 is a timing diagram 700 that illustrates the exercise of triggering control in a slave device 600 based on the status of a sequence executed within the slave device 600 provided in accordance with certain aspects disclosed herein. In the illustrated example, the slave device 600 initiates a sequence at a first point in time 704, which may be synchronized by an edge 702 of a clock signal 614 of the slave device 600. The sequencer logic 608 asserts the sequence active signal 612 while the sequence is being executed. The BoM provides a trigger 706 to the trigger handler 602 of the slave device 600. The trigger 706 may be provided in a dedicated signal or may be indicated by a command and/or configuration information transmitted by the BoM. The trigger handler 602 determines that the sequence active signal 612 is asserted and gates or withholds forwarding the trigger 706 until the sequence has completed. At a second point in time 708, the sequence has been completed and the sequencer logic 608 de-asserts the sequence active signal 612. The trigger handler 602 may then provide a pulse 710 in the trigger actuation signal 620. The pulse 710 may be provided after a delay 712 corresponding to the remainder of a period of the clock signal 614 during which the sequence active signal 612 is de-asserted. In some instances, the delay 712 includes multiple periods of the clock signal 614. In some instances, initiation of the pulse 710 is coincident with, or synchronized to an edge in the clock signal 614. The duration of the pulse 710 may be determined by application needs and/or configured by the BoM.

Figure 8:
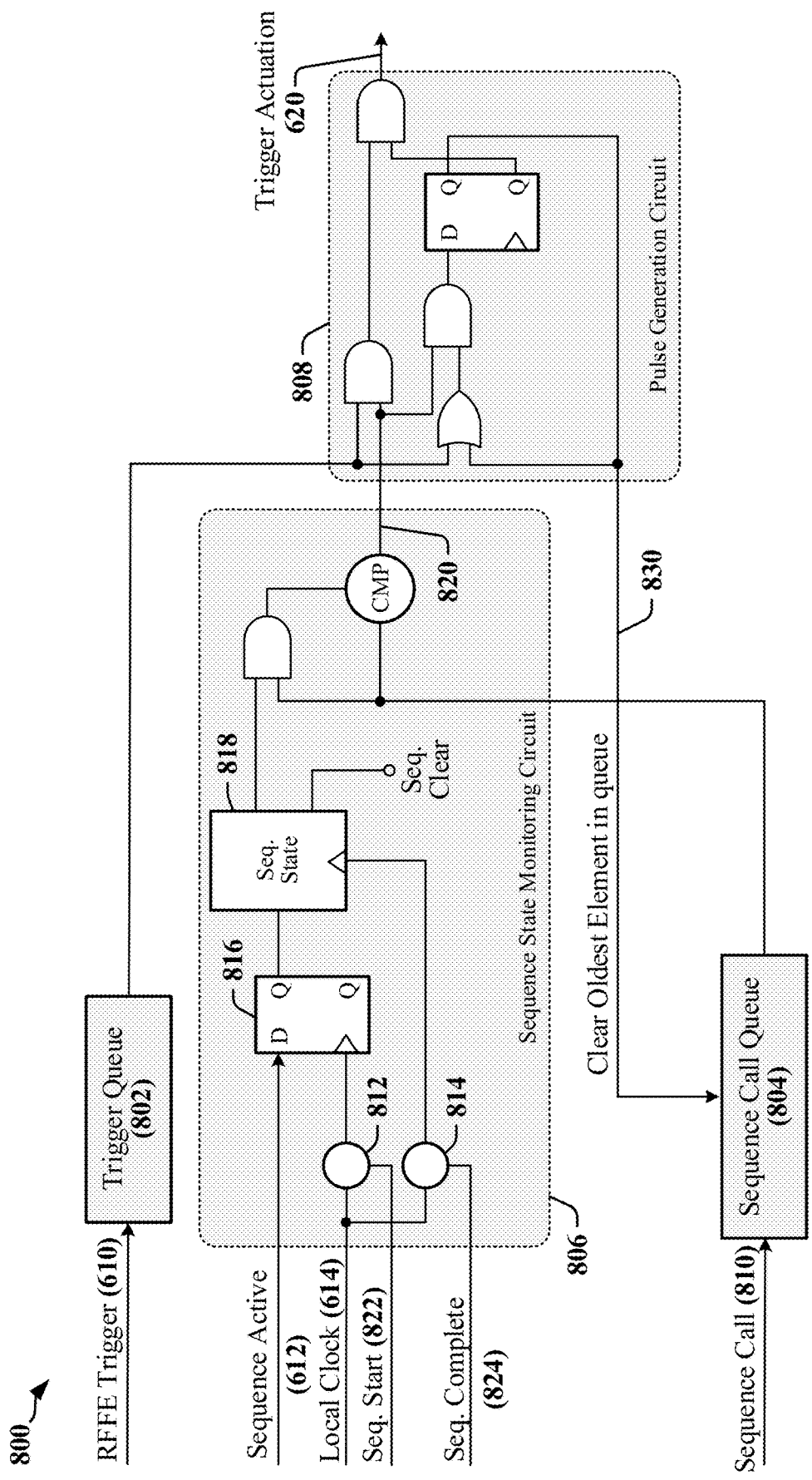
FIG. 8 illustrates an example of a sequence-based trigger control circuit that operates in accordance with certain aspects disclosed herein.

FIG. 8 illustrates an example of a sequence-based trigger control circuit 800 that operates in accordance with certain aspects disclosed herein. The trigger control circuit 800 may be provided in the trigger handler 602 of FIG. 6, for example. In this example, a trigger 610 received by the trigger handler 602 may be queued in a trigger queue 802. In some instances, the trigger 610 may be queued by queuing a trigger actuation command corresponding to the trigger 610. Each trigger passes through the trigger queue 802 and eventually causes a pulse 710 to be provided on the trigger actuation signal 620 after completion of a corresponding sequence. The BoM may initiate one or more sequences prior to initiating triggers on the slave device. The sequences may be represented as sequence calls 810 that may be maintained in a sequence call queue 804. In some implementations, each sequence call passes through the sequence call queue 804 and is handled by the sequencer logic 608 after exiting the sequence call queue 804.

In some instances, the triggers and sequences initiated by the BoM may be linked such that a trigger is actuated after a corresponding linked sequence has been completed. In some implementations, the trigger queue 802 and/or sequence call queue 804 may be operated in a First-In-First-Out (FIFO) manner. In some implementations, a queue management algorithm may be used to control and coordinate the flow of triggers and sequence calls through the respective queues 802, 804. In some implementations, a queue management algorithm may implement a priority-based scheme to manage the flow of triggers and sequence calls through the respective queues 802, 804. For example, triggers may be classified by type, destination, application-defined priority, latency tolerance and/or by other metric. A priority-based scheme may enable implementation of complex bus timing.

The state of the sequencer logic 608 and sequences being executed by the sequencer logic 608 may be determined by a sequence state monitoring circuit 806. In the illustrated example, the sequence state monitoring circuit 806 receives control signals from the sequencer logic 608, including the sequence active signal 612, a sequence start signal 822 and a sequence complete signal 824. Gating circuits 812 and 814 may receive the clock signal 614 provided by the local oscillator 604 and may provide clocking signals to flipflops 816, 818 under the control of the sequence start signal 822 and the sequence complete signal 824. The sequence state monitoring circuit 806 generates a trigger 820 that indicates the completion of a current sequence to a pulse generating circuit 808. When a trigger is waiting in the trigger queue 802 at the completion of the current sequence, the pulse generating circuit 808 may provide a pulse in the trigger actuation signal 620. The pulse generating circuit 808 may also provide a signal 830 that causes the sequence call queue to advance to the next sequence call.

In accordance with certain aspects of this disclosure, an RFFE slave device may be configured such that its sequencer logic can run multiple sequences, where each sequence can be associated with a different RFFE trigger. In the illustrated sequence-based trigger control circuit 800, incoming triggers and sequence calls are maintained in different queues 802, 804. The disclosed queuing mechanism can ensure that triggers are applied in the order in which they are received, and after their corresponding sequences have finished. The sequence-based trigger control circuit 800 provides signals that can be used to delete entries from the queues 802, 804 as triggers are processed. The sequence-based trigger control circuit 800 may also provide or receive signals that clear the queues 802, 804 for future sequences and triggers.

Examples of Processing Circuits and Methods

Figure 9:
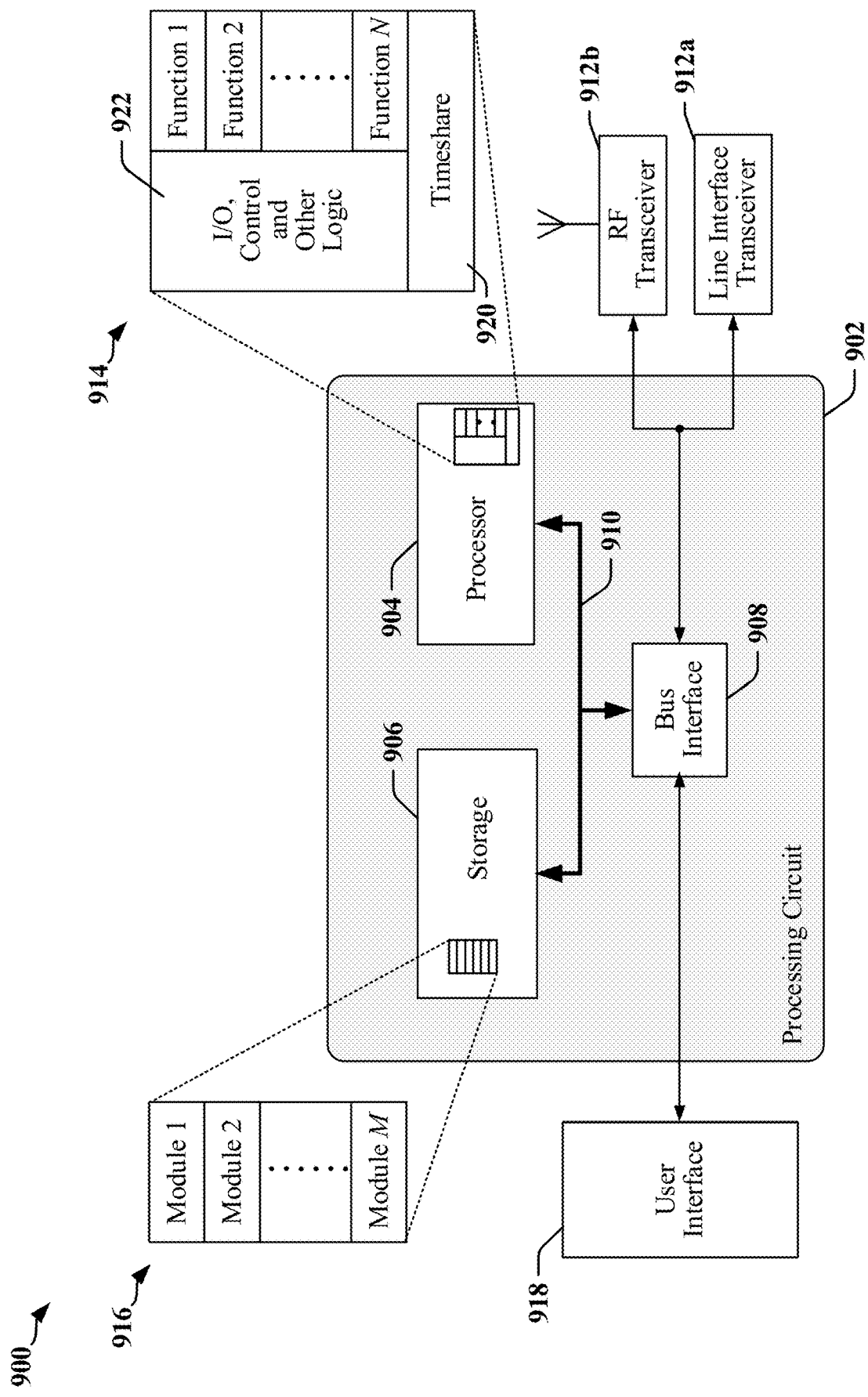
FIG. 9 illustrates one example of an apparatus employing a processing circuit that may be adapted to operate in accordance with certain aspects disclosed herein.

FIG. 9 is a diagram illustrating an example of a hardware implementation for an apparatus 900. In some examples, the apparatus 900 may perform one or more functions disclosed herein. In accordance with various aspects of the disclosure, an element, or any portion of an element, or any combination of elements as disclosed herein may be implemented using a processing circuit 902. The processing circuit 902 may include one or more processors 904 that are controlled by some combination of hardware and software modules. Examples of processors 904 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 904 may include specialized processors that perform specific functions, and that may be configured, augmented or controlled by one of the software modules 916. The one or more processors 904 may be configured through a combination of software modules 916 loaded during initialization, and further configured by loading or unloading one or more software modules 916 during operation.

In the illustrated example, the processing circuit 902 may be implemented with a bus architecture, represented generally by the bus 910. The bus 910 may include any number of interconnecting buses and bridges depending on the specific application of the processing circuit 902 and the overall design constraints. The bus 910 links together various circuits including the one or more processors 904, and processor-readable storage medium 906. Processor-readable storage medium 906 may include memory devices and mass storage devices, and may be referred to herein as computer-readable media and/or processor-readable media. The bus 910 may also link various other circuits such as timing sources, timers, peripherals, voltage regulators, and power management circuits. A bus interface 908 may provide an interface between the bus 910 and one or more transceivers 912a, 912b. A transceiver 912a, 912b may be provided for each networking technology supported by the processing circuit. In some instances, multiple networking technologies may share some or all of the circuitry or processing modules found in a transceiver 912a, 912b. Each transceiver 912a, 912b provides a means for communicating with various other apparatus over a transmission medium. In one example, a transceiver 912a may be used to couple the apparatus 900 to a multi-wire bus. In another example, a transceiver 912b may be used to connect the apparatus 900 to a radio access network. Depending upon the nature of the apparatus 900, a user interface 918 (e.g., keypad, display, speaker, microphone, joystick) may also be provided, and may be communicatively coupled to the bus 910 directly or through the bus interface 908.

A processor 904 may be responsible for managing the bus 910 and for general processing that may include the execution of software stored in a computer-readable medium that may include the processor-readable storage medium 906. In this respect, the processing circuit 902, including the processor 904, may be used to implement any of the methods, functions and techniques disclosed herein. The processor-readable storage medium 906 may be used for storing data that is manipulated by the processor 904 when executing software, and the software may be configured to implement certain methods disclosed herein.

One or more processors 904 in the processing circuit 902 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the processor-readable storage medium 906 or in an external computer-readable medium. The storage media may include transitory and/or non-transitory computer-readable medium. A non-transitory computer-readable medium may include, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The processor-readable storage medium 906 may also include, by way of example, a carrier wave, a transmission line, and any other suitable medium for transmitting software and/or instructions that may be accessed and read by a computer. The processor-readable storage medium 906 may reside in the processing circuit 902, in the processor 904, external to the processing circuit 902, or be distributed across multiple entities including the processing circuit 902. The processor-readable storage medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The processor-readable storage medium 906 may maintain software maintained and/or organized in loadable code segments, modules, applications, programs, etc., which may be referred to herein as software modules 916. Each of the software modules 916 may include instructions and data that, when installed or loaded on the processing circuit 902 and executed by the one or more processors 904, contribute to a run-time image 914 that controls the operation of the one or more processors 904. When executed, certain instructions may cause the processing circuit 902 to perform functions in accordance with certain methods, algorithms and processes described herein.

Some of the software modules 916 may be loaded during initialization of the processing circuit 902, and these software modules 916 may configure the processing circuit 902 to enable performance of the various functions disclosed herein. For example, some software modules 916 may configure internal devices and/or logic circuits 922 of the processor 904, and may manage access to external devices such as a transceiver 912a, 912b, the bus interface 908, the user interface 918, timers, mathematical coprocessors, and so on. The software modules 916 may include a control program and/or an operating system that interacts with interrupt handlers and device drivers, and that controls access to various resources provided by the processing circuit 902. The resources may include memory, processing time, access to a transceiver 912a, 912b, the user interface 918, and so on.

One or more processors 904 of the processing circuit 902 may be multifunctional, whereby some of the software modules 916 are loaded and configured to perform different functions or different instances of the same function. The one or more processors 904 may additionally be adapted to manage background tasks initiated in response to inputs from the user interface 918, the transceiver 912a, 912b, and device drivers, for example. To support the performance of multiple functions, the one or more processors 904 may be configured to provide a multitasking environment, whereby each of a plurality of functions is implemented as a set of tasks serviced by the one or more processors 904 as needed or desired. In one example, the multitasking environment may be implemented using a timesharing program 920 that passes control of a processor 904 between different tasks, whereby each task returns control of the one or more processors 904 to the timesharing program 920 upon completion of any outstanding operations and/or in response to an input such as an interrupt. When a task has control of the one or more processors 904, the processing circuit is effectively specialized for the purposes addressed by the function associated with the controlling task. The timesharing program 920 may include an operating system, a main loop that transfers control on a round-robin basis, a function that allocates control of the one or more processors 904 in accordance with a prioritization of the functions, and/or an interrupt driven main loop that responds to external events by providing control of the one or more processors 904 to a handling function.

Figure 10:
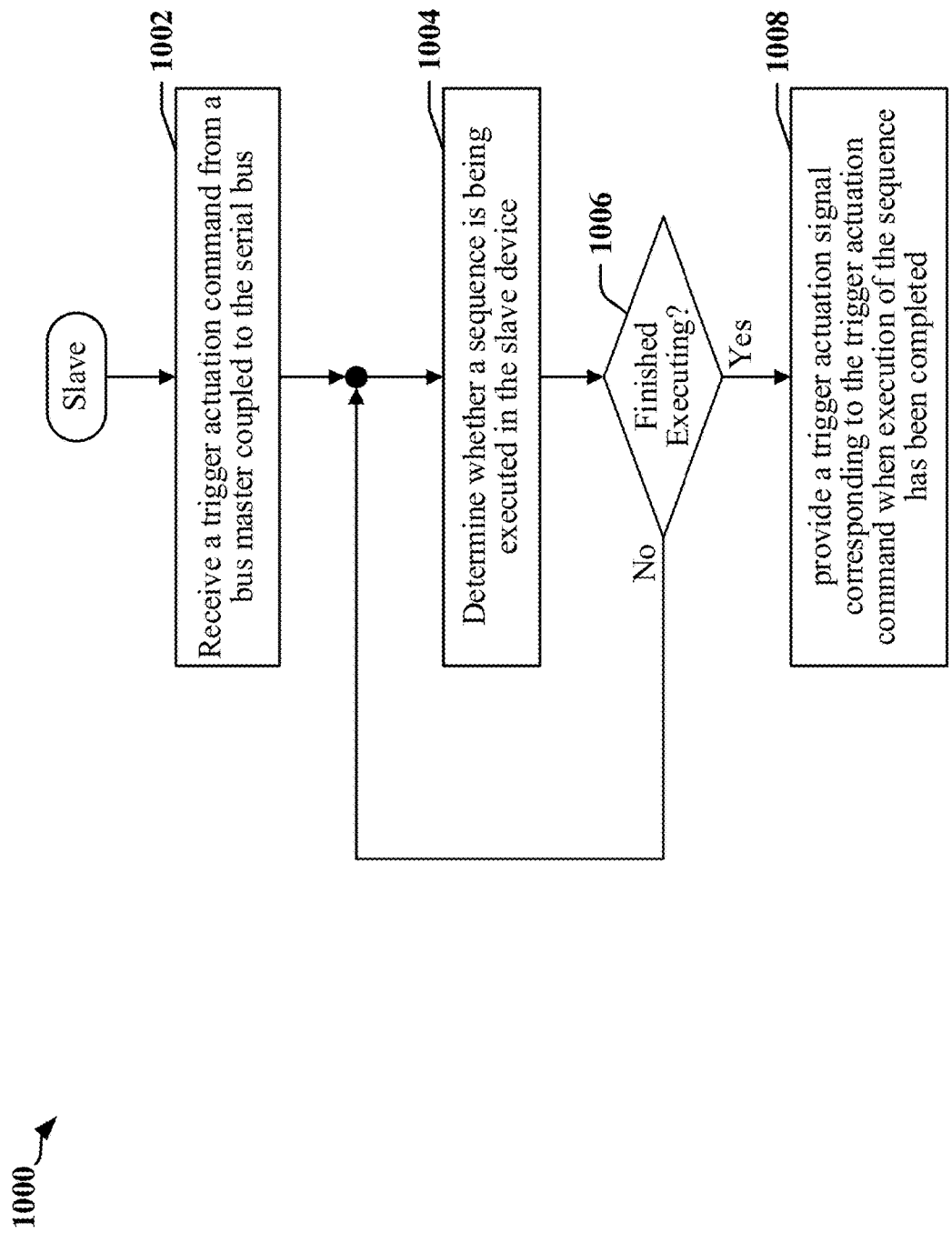
FIG. 10 is a flowchart that illustrates a method that may be performed by a slave device coupled to a serial bus in accordance with certain aspects disclosed herein.

FIG. 10 is a flowchart 1000 of a method that may be performed by a device coupled to a serial bus. In one example, the serial bus may be operated in accordance with RFFE protocols. At block 1002, the device may receive a trigger actuation command from a bus master coupled to the serial bus. At block 1004, the device may determine whether a sequence is being executed in the slave device. If at block 1006, the device has determined that execution of the sequences has not been completed, then the method resumes at block 1004. If at block 1006, the device has determined that execution of the sequences has been completed, then the method continues at block 1008. At block 1008, the device may provide a trigger actuation signal corresponding to the trigger actuation command.

In some examples, the device may receive a sequence initiation command before receiving the trigger actuation command. The device may initiate the sequence in response to the sequence initiation command.

In some implementations, the device may receive trigger configuration information before the trigger actuation command is received, and may populate one or more holding registers using information provided in the trigger configuration information. The device may cause the content of the holding registers to be transferred to corresponding destination registers when the trigger actuation signal is provided.

In certain implementations, the device may queue the trigger actuation command in a first queue. The device may receive a sequence initiation command before receiving the trigger actuation command, queue the sequence initiation command in a second queue, and initiate the sequence when the sequence initiation command exits the second queue. Each of a plurality of trigger actuation commands in the first queue may be associated with one of a plurality of sequence initiation commands in the second queue. The sequence may be initiated in response to a sequence initiation command that is associated with the trigger actuation command corresponding to the trigger actuation signal.

In some instances, the device may queue prioritized trigger actuation commands in the trigger queue, and may provide the trigger actuation signal based on relative priorities of two or more of the plurality of prioritized trigger actuation commands.

Figure 11:
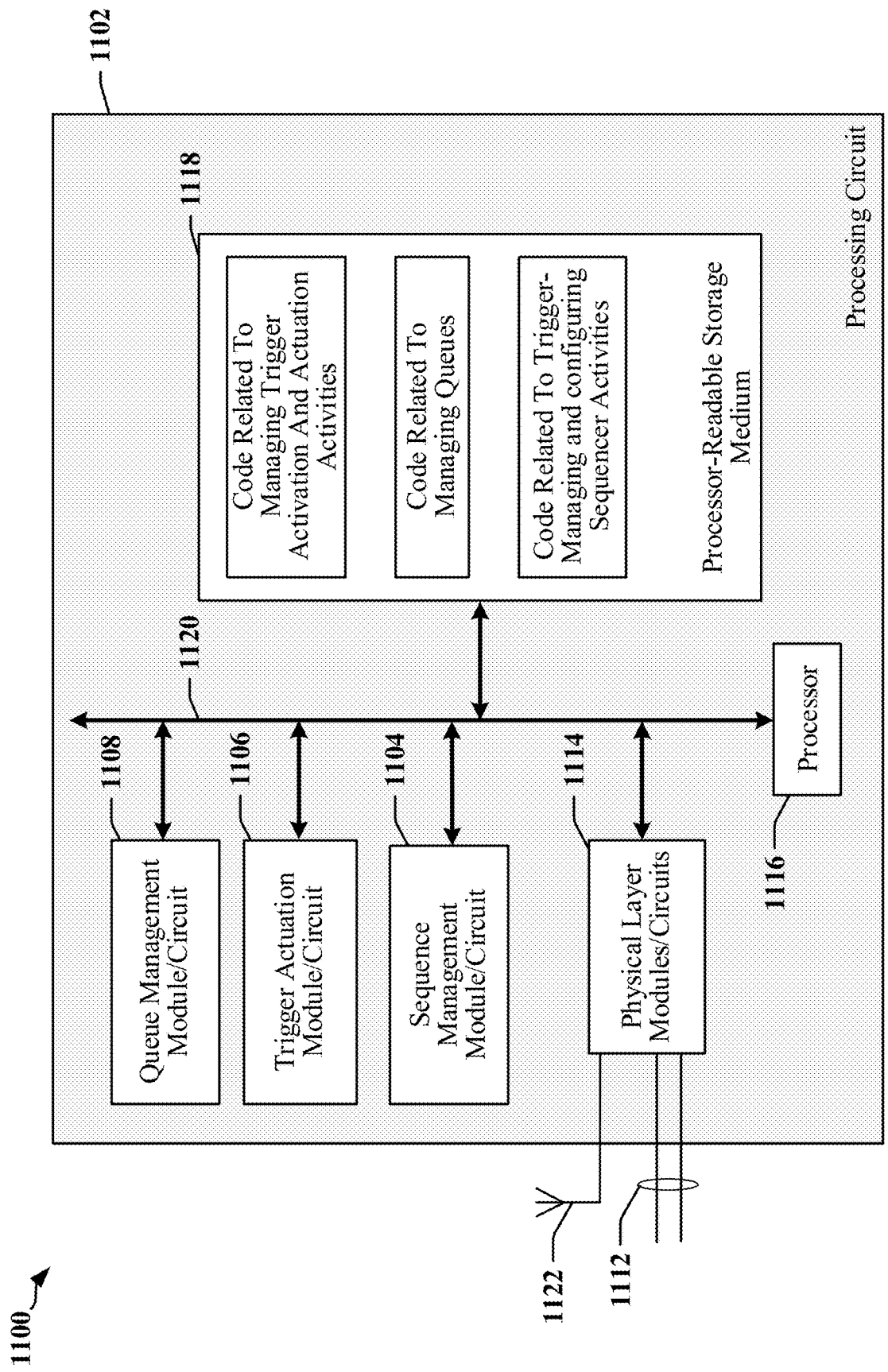
FIG. 11 illustrates a first example of a hardware implementation for an apparatus adapted in accordance with certain aspects disclosed herein.

FIG. 11 is a diagram illustrating a simplified example of a hardware implementation for an apparatus 1100 employing a processing circuit 1102. The processing circuit typically has a controller or processor 1116 that may include one or more microprocessors, microcontrollers, digital signal processors, sequencers and/or state machines. The processing circuit 1102 may be implemented with a bus architecture, represented generally by the bus 1120. The bus 1120 may include any number of interconnecting buses and bridges depending on the specific application of the processing circuit 1102 and the overall design constraints. The bus 1120 links together various circuits including one or more processors and/or hardware modules, represented by the controller or processor 1116, the modules or circuits 1104, 1106 and 1108 and the processor-readable storage medium 1118. One or more physical layer circuits and/or modules 1114 may be provided to support communications over a communication link implemented using a serial bus 1112, through an antenna or antenna array 1122 (to a radio access network for example), and so on. The bus 1120 may also link various other circuits such as timing sources, peripherals, voltage regulators, and power management circuits, which are well known in the art, and therefore, will not be described any further.

The processor 1116 is responsible for general processing, including the execution of software, code and/or instructions stored on the processor-readable storage medium 1118. The processor-readable storage medium 1118 may include a non-transitory storage medium. The software, when executed by the processor 1116, causes the processing circuit 1102 to perform the various functions described supra for any particular apparatus. The processor-readable storage medium may be used for storing data that is manipulated by the processor 1116 when executing software. The processing circuit 1102 further includes at least one of the modules 1104, 1106 and 1108. The modules 1104, 1106 and 1108 may be software modules running in the processor 1116, resident/stored in the processor-readable storage medium 1118, one or more hardware modules coupled to the processor 1116, or some combination thereof. The modules 1104, 1106 and 1108 may include microcontroller instructions, state machine configuration parameters, or some combination thereof.

In one configuration, the apparatus 1100 includes modules and/or circuits 1104 adapted to manage, configure and/or control a sequencer. The apparatus 1100 may include modules and/or circuits 1106 adapted to generate trigger actuation signals at a time coincident with, or indicated by the completion of sequences. The apparatus 1100 may include modules and/or circuits 1108 adapted to manage and/or operate queues for sequence calls and/or trigger activation commands.

In one example, the apparatus 1100 includes physical layer circuits and/or modules 1114 that implement an interface circuit adapted to couple the apparatus 1100 to a serial bus 1112, including a first serial bus. The apparatus 1100 may have a trigger handler implemented using logic circuits and/or the processor 1116. The interface circuit may be configured to receive a trigger actuation command from a bus master coupled to the serial bus. The sequencer may be configured to provide a sequence status indicator, and the trigger handler may be configured to provide a trigger actuation signal corresponding to the trigger actuation command when the sequence status indicator indicates that execution of a sequence has been completed.

In some instances, the interface circuit may be further configured to receive a sequence initiation command before the trigger actuation command is received. The sequencer may be further configured to initiate the sequence in response to the sequence initiation command.

In some examples, the interface circuit is further configured to receive trigger configuration information before the trigger actuation command is received, and populate one or more holding registers using information provided in the trigger configuration information. The trigger actuation signal may be configured to cause content of the one or more holding registers to be transferred to corresponding destination registers when the trigger actuation signal is provided.

In certain implementations, the apparatus 1100 includes a first queue configured to queue a plurality of sequence initiation commands and a second queue configured to queue a plurality of trigger actuation commands. The sequencer may be further configured to initiate the sequence when a corresponding sequence initiation command exits the second queue. Each of a plurality of trigger actuation commands in a first queue may be associated with one of a plurality of sequence initiation commands in the second queue. The sequence may be initiated in response to a corresponding sequence initiation command that is associated with the trigger actuation command corresponding to the trigger actuation signal. The trigger actuation commands in the first queue may include prioritized trigger actuation commands, and the trigger actuation signal may be provided based on relative priorities of two or more of the prioritized trigger actuation commands.

The processor-readable storage medium 1118 may include instructions that cause the processing circuit 1102 to receive a trigger actuation command from a bus master coupled to a serial bus, determine that a sequence is being executed in a slave device, and provide a trigger actuation signal corresponding to the trigger actuation command when execution of the sequence has been completed. The processor-readable storage medium 1118 may be implemented using non-transitory storage media. The processor-readable storage medium 1118 may include code for receiving a sequence initiation command before receiving the trigger actuation command, and initiating the sequence in response to the sequence initiation command. The processor-readable storage medium 1118 may include code for receiving trigger configuration information before the trigger actuation command is received, and populate one or more holding registers using information provided in the trigger configuration information. The processor-readable storage medium 1118 may include code for causing the content of the one or more holding registers to be transferred to corresponding destination registers when the trigger actuation signal is provided.

The processor-readable storage medium 1118 may include code for queuing the trigger actuation command in a first queue. The processor-readable storage medium 1118 may include code for receiving a sequence initiation command before receiving the trigger actuation command, queuing the sequence initiation command in a second queue, and initiating the sequence when the sequence initiation command exits the second queue. Each of a plurality of trigger actuation commands in the first queue may be associated with one of a plurality of sequence initiation commands in the second queue. The sequence may be initiated in response to a sequence initiation command that is associated with the trigger actuation command corresponding to the trigger actuation signal.

The processor-readable storage medium 1118 may include code for queuing a plurality of prioritized trigger actuation commands in a trigger queue, and providing the trigger actuation signal based on relative priorities of two or more of the plurality of prioritized trigger actuation commands.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of data communications at a slave device coupled to a serial bus, comprising:
    receiving a trigger actuation command at the slave device from a bus master coupled to the serial bus;
    determining that a sequence of actions is being executed in the slave device; and
    responsive to the trigger actuation command, timing actuation of one or more triggers in the slave device based on execution of the sequence of actions, including:
        refraining from actuating the one or more triggers while the sequence of actions is being executed; and
        providing a trigger actuation signal configured to actuate the one or more triggers when the execution of the sequence of actions has been completed.

2. The method of claim 1, further comprising:
    receiving a sequence initiation command before receiving the trigger actuation command; and
    initiating the sequence of actions in response to the sequence initiation command.

3. The method of claim 1, further comprising:
    receiving trigger configuration information before the trigger actuation command is received; and
    populating one or more holding registers using information provided in the trigger configuration information.

4. The method of claim 3, further comprising:
    causing content of the one or more holding registers to be transferred to corresponding destination registers when the trigger actuation signal is provided.

5. The method of claim 1, further comprising:
    queuing the trigger actuation command in a first queue.

6. The method of claim 5, further comprising:
    receiving a sequence initiation command before receiving the trigger actuation command;
    queuing the sequence initiation command in a second queue; and
    initiating the sequence of actions when the sequence initiation command exits the second queue.

7. The method of claim 6, wherein each of a plurality of trigger actuation commands in the first queue is associated with one of a plurality of sequence initiation commands in the second queue, and wherein the sequence of actions is initiated in response to the sequence initiation command that is associated with the trigger actuation command corresponding to the trigger actuation signal.

8. The method of claim 1, further comprising:
    queuing a plurality of prioritized trigger actuation commands in a trigger queue; and
    providing the trigger actuation signal based on relative priorities of two or more of the plurality of prioritized trigger actuation commands.

9. The method of claim 1, wherein the serial bus is operated in accordance with a Radio Frequency Front-End (RFFE) protocol, and wherein the sequence of actions is unrelated to the trigger actuation command.

10. A data communication apparatus comprising:
    an interface circuit configured to couple the data communication apparatus to a serial bus and further configured to receive a trigger actuation command from a bus master coupled to the serial bus;
    a sequencer configured to execute a sequence of actions and to provide a sequence status indicator; and
    a trigger handler responsive to the trigger actuation command configured to:
        refrain from actuating one or more triggers while the sequence status indicator indicates that the sequence of actions is being executed; and
        provide a trigger actuation signal configured to actuate the one or more triggers when the sequence status indicator indicates that execution of the sequence of actions has been completed.

11. The data communication apparatus of claim 10, wherein the interface circuit is further configured to receive a sequence initiation command before the trigger actuation command is received, and wherein the sequencer is further configured to initiate the sequence of actions in response to the sequence initiation command.

12. The data communication apparatus of claim 10, wherein the interface circuit is further configured to:
    receive trigger configuration information before the trigger actuation command is received; and populate one or more holding registers using information provided in the trigger configuration information.

13. The data communication apparatus of claim 12, wherein the interface circuit is further configured to:
cause content of the one or more holding registers to be transferred to corresponding destination registers when the trigger actuation signal is provided.

14. The data communication apparatus of claim 10, further comprising:
a first queue configured to queue a plurality of sequence initiation commands; and
a second queue configured to queue a plurality of trigger actuation commands,
wherein the sequencer is further configured to initiate the sequence of actions when a corresponding sequence initiation command exits the first queue.

15. The data communication apparatus of claim 14, wherein each of the plurality of trigger actuation commands in the second queue is associated with one of the plurality of sequence initiation commands in the first queue, and wherein the sequence of actions is initiated in response to the corresponding sequence initiation command that is associated with the trigger actuation command corresponding to the trigger actuation signal.

16. The data communication apparatus of claim 14, wherein the plurality of trigger actuation commands in the second queue includes prioritized trigger actuation commands, and wherein the trigger actuation signal is provided based on relative priorities of two or more of the prioritized trigger actuation commands.

17. The data communication apparatus of claim 10, wherein the serial bus is operated in accordance with a Radio Frequency Front-End (RFFE) protocol, and wherein the sequence of actions is unrelated to the trigger actuation command.

18. A non-transitory processor-readable storage medium comprising code for:
receiving, at a slave device, a trigger actuation command from a bus master coupled to a serial bus;
determining that a sequence of actions is being executed in the slave device; and
responsive to the trigger actuation command, timing actuation of one or more triggers in the slave device based on execution of the sequence of actions, including:
refraining from actuating the one or more triggers while the sequence of actions is being executed; and
providing a trigger actuation signal configured to actuate the one or more triggers when the execution of the sequence of actions has been completed.

19. The non-transitory storage medium of claim 18, further comprising code for:
receiving a sequence initiation command before receiving the trigger actuation command; and
initiating the sequence of actions in response to the sequence initiation command.

20. The non-transitory storage medium of claim 18, further comprising code for:
receiving trigger configuration information before the trigger actuation command is received; and
populating one or more holding registers using information provided in the trigger configuration information.

21. The non-transitory storage medium of claim 20, further comprising code for:
causing content of the one or more holding registers to be transferred to corresponding destination registers when the trigger actuation signal is provided.

22. The non-transitory storage medium of claim 18, further comprising code for:
queuing the trigger actuation command in a first queue.

23. The non-transitory storage medium of claim 22, further comprising code for:
receiving a sequence initiation command before receiving the trigger actuation command;
queuing the sequence initiation command in a second queue; and
initiating the sequence of actions when the sequence initiation command exits the second queue.

24. The non-transitory storage medium of claim 23, wherein each of a plurality of trigger actuation commands in the first queue is associated with one of a plurality of sequence initiation commands in the second queue, and wherein the sequence of actions is initiated in response to the sequence initiation command that is associated with the trigger actuation command corresponding to the trigger actuation signal.

25. The non-transitory storage medium of claim 18, further comprising code for:
queuing a plurality of prioritized trigger actuation commands in a trigger queue; and
providing the trigger actuation signal based on relative priorities of two or more of the plurality of prioritized trigger actuation commands.

26. The non-transitory storage medium of claim 18, wherein the serial bus is operated in accordance with a Radio Frequency Front-End (RFFE) protocol, and wherein the sequence of actions is unrelated to the trigger actuation command.

27. A data communication apparatus configured to operate as a slave device, comprising:
means for receiving commands from a bus master coupled to a serial bus, the means for receiving commands being configured to receive a trigger actuation command from the bus master;
means for determining that a sequence of actions is being executed in the data communication apparatus; and
means for providing a trigger actuation signal, configured to time actuation of one or more triggers in the data communication apparatus in response to the trigger actuation command and based on execution of the sequence of actions, wherein the means for providing the trigger actuation signal is further configured to:
refrain from actuating the one or more triggers while the sequence of actions is being executed; and
provide the trigger actuation signal configured to actuate the one or more triggers when the execution of the sequence of actions has been completed.

28. The data communication apparatus of claim 27, wherein the means for receiving commands is configured to receive a sequence initiation command before the trigger actuation command is received, and wherein the means for determining that the sequence of actions is being executed is provided in a sequencer, wherein the sequencer is configured to initiate the sequence of actions in response to the sequence initiation command.

29. The data communication apparatus of claim 28, further comprising:
a first queue configured to queue a plurality of sequence initiation commands; and
a second queue configured to queue a plurality of trigger actuation commands,
wherein the sequencer is further configured to initiate the sequence of actions when the sequence initiation command exits the first queue, wherein each of the plurality of trigger actuation commands in the second queue is associated with one of the plurality of sequence initiation commands in the first queue, and wherein the sequence of actions is initiated in response to the sequence initiation command that is associated with the trigger actuation command corresponding to the trigger actuation signal.

30. The data communication apparatus of claim 27, wherein the serial bus is operated in accordance with a Radio Frequency Front-End (RFFE) protocol, and wherein the sequence of actions is unrelated to the trigger actuation command.

\* \* \* \* \*